(12) United States Patent
Berghegger (10) Patent No.: US 8,488,355 B2
(45) Date of Patent: Jul. 16, 2013

(54) DRIVER FOR A SYNCHRONOUS RECTIFIER AND POWER CONVERTER EMPLOYING THE SAME

(75) Inventor: Ralf Schroeder genannt Berghegger, Glandorf (DE)

(73) Assignee: Power Systems Technologies, Ltd., Ebene (MU)

( * ) Notice: Subject to any disclaimer, the term of this patent is extended or adjusted under 35 U.S.C. 154(b) by 552 days.

(21) Appl. No.: 12/618,404

(22) Filed: Nov. 13, 2009

(65) Prior Publication Data

US 2010/0123486 A1 May 20, 2010

Related U.S. Application Data

(60) Provisional application No. 61/114,675, filed on Nov. 14, 2008.

(51) Int. Cl.
*H02M 7/217* (2006.01)
*H02M 3/335* (2006.01)

(52) U.S. Cl.
USPC ............ 363/127; 363/21.06; 363/21.14; 363/89

(58) Field of Classification Search
USPC ............... 363/21.06, 21.14, 127, 89
See application file for complete search history.

(56) References Cited

U.S. PATENT DOCUMENTS

| | | |
|---|---|---|
| 2,473,662 A | 6/1949 | Pohm |
| 3,007,060 A | 10/1961 | Guenther |
| 3,346,798 A | 10/1967 | Dinger |
| 3,484,562 A | 12/1969 | Kronfeld |
| 3,602,795 A | 8/1971 | Gunn |
| 3,708,742 A | 1/1973 | Gunn |
| 4,202,031 A | 5/1980 | Hesler et al. |
| 4,257,087 A | 3/1981 | Cuk |
| 4,274,071 A | 6/1981 | Pfarre |
| 4,613,841 A | 9/1986 | Roberts |
| 4,770,667 A | 9/1988 | Evans et al. |
| 4,770,668 A | 9/1988 | Skoultchi et al. |
| 4,785,387 A | 11/1988 | Lee et al. |
| 4,799,138 A | 1/1989 | Chahabadi et al. |

(Continued)

FOREIGN PATENT DOCUMENTS

| | | |
|---|---|---|
| CN | 101141099 | 3/2008 |
| CN | 201252294 | 6/2009 |

(Continued)

OTHER PUBLICATIONS

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

(Continued)

*Primary Examiner* — Gary L Laxton
(74) *Attorney, Agent, or Firm* — Boisbrun Hofman, PLLC (57) ABSTRACT

A driver for a switch, method of driving a switch, and a power converter employing the same. The driver for the switch includes a first driver switch coupled to a terminal of the switch. The driver also includes a second driver switch inverted with respect to the first driver switch and coupled to another terminal of the switch, wherein the first and second driver switches are configured to provide a drive signal to a control terminal of the switch.

35 Claims, 10 Drawing Sheets

U.S. PATENT DOCUMENTS

| | | | |
|---|---|---|---|
| 4,837,496 A | 6/1989 | Erdi | |
| 4,866,367 A | 9/1989 | Ridley et al. | |
| 4,962,354 A | 10/1990 | Visser et al. | |
| 4,964,028 A | 10/1990 | Spataro | |
| 5,014,178 A | 5/1991 | Balakrishnan | |
| 5,172,309 A | 12/1992 | DeDoncker et al. | |
| 5,204,809 A | 4/1993 | Andresen | |
| 5,208,739 A | 5/1993 | Sturgeon | |
| 5,225,971 A | 7/1993 | Spreen | |
| 5,262,930 A | 11/1993 | Hua et al. | |
| 5,282,126 A | 1/1994 | Husgen | |
| 5,285,396 A | 2/1994 | Aoyama | |
| 5,303,138 A | 4/1994 | Rozman | |
| 5,343,140 A | 8/1994 | Gegner | |
| 5,453,923 A * | 9/1995 | Scalais et al. | 363/53 |
| 5,459,652 A | 10/1995 | Faulk | |
| 5,477,175 A | 12/1995 | Tisinger et al. | |
| 5,523,673 A | 6/1996 | Ratliff et al. | |
| 5,539,630 A | 7/1996 | Pietkiewicz et al. | |
| 5,815,383 A | 9/1998 | Lei | |
| 5,880,942 A | 3/1999 | Leu | |
| 5,907,481 A | 5/1999 | Svärdsjö | |
| 5,929,665 A | 7/1999 | Ichikawa et al. | |
| 5,946,207 A | 8/1999 | Schoofs | |
| 5,959,850 A | 9/1999 | Lim | |
| 5,977,853 A | 11/1999 | Ooi et al. | |
| 5,999,429 A | 12/1999 | Brown | |
| 6,046,664 A | 4/2000 | Weller et al. | |
| 6,055,166 A | 4/2000 | Jacobs et al. | |
| 6,060,943 A | 5/2000 | Jansen | |
| 6,069,798 A | 5/2000 | Liu | |
| 6,078,510 A | 6/2000 | Spampinato et al. | |
| 6,125,046 A | 9/2000 | Jang et al. | |
| 6,160,721 A | 12/2000 | Kossives et al. | |
| 6,288,501 B1 | 9/2001 | Nakamura et al. | |
| 6,288,920 B1 | 9/2001 | Jacobs et al. | |
| 6,295,217 B1 | 9/2001 | Yang et al. | |
| 6,304,460 B1 | 10/2001 | Cuk | |
| 6,317,021 B1 | 11/2001 | Jansen | |
| 6,317,337 B1 | 11/2001 | Yasumura | |
| 6,325,035 B1 | 12/2001 | Codina et al. | |
| 6,344,986 B1 | 2/2002 | Jain et al. | |
| 6,345,364 B1 | 2/2002 | Lee | |
| 6,373,727 B1 | 4/2002 | Hedenskog et al. | |
| 6,400,579 B2 | 6/2002 | Cuk | |
| 6,438,009 B2 * | 8/2002 | Assow | 363/127 |
| 6,462,965 B1 | 10/2002 | Uesono | |
| 6,466,461 B2 | 10/2002 | Mao et al. | |
| 6,469,564 B1 | 10/2002 | Jansen | |
| 6,548,992 B1 | 4/2003 | Alcantar et al. | |
| 6,552,917 B1 | 4/2003 | Bourdillon | |
| 6,570,268 B1 | 5/2003 | Perry et al. | |
| 6,580,627 B2 | 6/2003 | Toshio | |
| 6,608,768 B2 | 8/2003 | Sula | |
| 6,611,132 B2 | 8/2003 | Nakagawa et al. | |
| 6,614,206 B1 | 9/2003 | Wong et al. | |
| 6,654,259 B2 | 11/2003 | Koshita et al. | |
| 6,668,296 B1 | 12/2003 | Dougherty et al. | |
| 6,674,658 B2 | 1/2004 | Mao et al. | |
| 6,687,137 B1 | 2/2004 | Yasumura | |
| 6,784,644 B2 | 8/2004 | Xu et al. | |
| 6,804,125 B2 | 10/2004 | Brkovic | |
| 6,813,170 B2 | 11/2004 | Yang | |
| 6,831,847 B2 | 12/2004 | Perry | |
| 6,856,149 B2 * | 2/2005 | Yang | 324/726 |
| 6,862,194 B2 | 3/2005 | Yang et al. | |
| 6,867,986 B2 | 3/2005 | Amei | |
| 6,882,548 B1 | 4/2005 | Jacobs et al. | |
| 6,906,934 B2 | 6/2005 | Yang et al. | |
| 6,943,553 B2 | 9/2005 | Zimmermann et al. | |
| 6,977,824 B1 | 12/2005 | Yang et al. | |
| 7,009,486 B1 | 3/2006 | Goeke et al. | |
| 7,016,204 B2 | 3/2006 | Yang et al. | |
| 7,095,638 B2 | 8/2006 | Uusitalo | |
| 7,098,640 B2 | 8/2006 | Brown | |
| 7,099,163 B1 | 8/2006 | Ying | |
| 7,170,268 B2 | 1/2007 | Kim | |
| 7,209,024 B2 | 4/2007 | Nakahori | |
| 7,269,038 B2 | 9/2007 | Shekhawat et al. | |
| 7,301,785 B2 | 11/2007 | Yasumura | |
| 7,312,686 B2 | 12/2007 | Bruno | |
| 7,339,801 B2 | 3/2008 | Yasumura | |
| 7,348,612 B2 | 3/2008 | Sriram et al. | |
| 7,360,004 B2 | 4/2008 | Dougherty et al. | |
| 7,362,592 B2 | 4/2008 | Yang et al. | |
| 7,362,593 B2 | 4/2008 | Yang et al. | |
| 7,375,607 B2 | 5/2008 | Lee et al. | |
| 7,386,404 B2 | 6/2008 | Cargonja et al. | |
| 7,446,512 B2 | 11/2008 | Nishihara et al. | |
| 7,447,049 B2 | 11/2008 | Garner et al. | |
| 7,471,523 B2 | 12/2008 | Yang | |
| 7,489,225 B2 | 2/2009 | Dadafshar | |
| 7,499,295 B2 | 3/2009 | Indika de Silva et al. | |
| 7,558,037 B1 | 7/2009 | Gong et al. | |
| 7,558,082 B2 | 7/2009 | Jitaru | |
| 7,567,445 B2 | 7/2009 | Coulson et al. | |
| 7,630,219 B2 | 12/2009 | Lee | |
| 7,633,369 B2 | 12/2009 | Chandrasekaran et al. | |
| 7,663,183 B2 | 2/2010 | Brar et al. | |
| 7,667,986 B2 | 2/2010 | Artusi et al. | |
| 7,675,758 B2 | 3/2010 | Artusi et al. | |
| 7,675,759 B2 | 3/2010 | Artusi et al. | |
| 7,675,764 B2 | 3/2010 | Chandrasekaran et al. | |
| 7,715,217 B2 | 5/2010 | Manabe et al. | |
| 7,733,679 B2 | 6/2010 | Luger et al. | |
| 7,746,041 B2 | 6/2010 | Xu et al. | |
| 7,778,050 B2 | 8/2010 | Yamashita | |
| 7,778,051 B2 | 8/2010 | Yang | |
| 7,787,264 B2 | 8/2010 | Yang et al. | |
| 7,791,903 B2 | 9/2010 | Zhang et al. | |
| 7,795,849 B2 | 9/2010 | Sohma | |
| 7,813,101 B2 | 10/2010 | Morikawa | |
| 7,847,535 B2 | 12/2010 | Meynard et al. | |
| 7,889,517 B2 | 2/2011 | Artusi et al. | |
| 7,889,521 B2 * | 2/2011 | Hsu | 363/21.14 |
| 7,940,035 B2 | 5/2011 | Yang | |
| 7,965,528 B2 | 6/2011 | Yang et al. | |
| 7,983,063 B2 | 7/2011 | Lu et al. | |
| 8,004,112 B2 | 8/2011 | Koga et al. | |
| 8,179,699 B2 | 5/2012 | Tumminaro et al. | |
| 2002/0057080 A1 | 5/2002 | Telefus et al. | |
| 2003/0026115 A1 | 2/2003 | Miyazaki | |
| 2003/0063483 A1 | 4/2003 | Carsten | |
| 2003/0063484 A1 | 4/2003 | Carsten | |
| 2003/0086279 A1 | 5/2003 | Bourdillon | |
| 2004/0200631 A1 | 10/2004 | Chen | |
| 2004/0217794 A1 | 11/2004 | Strysko | |
| 2006/0109698 A1 | 5/2006 | Qu | |
| 2007/0241721 A1 | 10/2007 | Weinstein et al. | |
| 2008/0137381 A1 | 6/2008 | Beasley | |
| 2008/0205104 A1 | 8/2008 | Lev et al. | |
| 2008/0298106 A1 | 12/2008 | Tateishi | |
| 2009/0257250 A1 | 10/2009 | Liu | |
| 2009/0273957 A1 | 11/2009 | Feldtkeller | |
| 2009/0284994 A1 | 11/2009 | Lin et al. | |
| 2009/0315530 A1 | 12/2009 | Baranwal | |
| 2010/0091522 A1 | 4/2010 | Chandrasekaran et al. | |
| 2010/0149838 A1 | 6/2010 | Artusi et al. | |
| 2010/0182806 A1 | 7/2010 | Garrity et al. | |
| 2010/0188876 A1 | 7/2010 | Garrity et al. | |
| 2010/0254168 A1 | 10/2010 | Chandrasekaran | |
| 2010/0321958 A1 | 12/2010 | Brinlee et al. | |
| 2010/0321964 A1 | 12/2010 | Brinlee et al. | |
| 2011/0038179 A1 | 2/2011 | Zhang | |
| 2011/0134664 A1 | 6/2011 | Berghegger | |
| 2011/0149607 A1 | 6/2011 | Jungreis et al. | |
| 2011/0182089 A1 | 7/2011 | Genannt Berghegger | |
| 2011/0239008 A1 | 9/2011 | Lam et al. | |
| 2011/0305047 A1 | 12/2011 | Jungreis et al. | |
| 2012/0243271 A1 | 9/2012 | Berghegger | |
| 2012/0294048 A1 | 11/2012 | Brinlee | |

FOREIGN PATENT DOCUMENTS

| | | |
|---|---|---|
| EP | 0 665 634 A1 | 1/1994 |
| JP | 57097361 | 6/1982 |
| WO | WO8700991 | 2/1987 |
| WO | WO2010083511 | 7/2010 |

| WO | WO2010083514 | 7/2010 |
| WO | WO2010114914 | 10/2010 |
| WO | WO2011116225 | 9/2011 |

OTHER PUBLICATIONS

Kuwabara, K., et al., "Switched-Capacitor DC-DC Converters," Fujitsu Limited, IEEE, 1988, Kawasaki, Japan, pp. 213-218.

Maxim, Application Note 725, www.maxim-ic.com/an725, Maxim Integrated Products, Nov. 29, 2001, 8 pages.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Texas Instruments Incorporated, "LT1054, LT1054Y Switched-Capacitor Voltage Converters With Regulators," SLVS033C, Feb. 1990—Revised Jul. 1998, 25 pages.

Vallamkonda, S., "Limitations of Switching Voltage Regulators," A Thesis in Electrical Engineering, Texas Tech University, May 2004, 89 pages.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

* cited by examiner

DRIVER FOR A SYNCHRONOUS RECTIFIER AND POWER CONVERTER EMPLOYING THE SAME

This application claims the benefit of U.S. Provisional Application No. 61/114,675, entitled "Driver for a Synchronous Rectifier and Power Converter Employing the Same," filed on Nov. 14, 2008, which application is incorporated herein by reference.

TECHNICAL FIELD

The present invention is directed, in general, to power electronics and, more specifically, to a power converter and method of generating a drive signal for a switch operable as a synchronous rectifier in the power converter.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the power switches of the power converter. The duty cycle is a ratio represented by a conduction period of a power switch to a switching period thereof. Thus, if a power switch conducts for half of the switching period, the duty cycle for the power switch would be 0.5 (or 50%). Additionally, as voltage or current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

To produce a dc output voltage, power converters often employ diodes to rectify an ac voltage produced across a secondary winding of a transformer. The power converter may also employ a diode to provide a current path to provide continuity for a current in an inductor such as an output filter inductor. The aforementioned diode is frequently referred to as a "freewheeling diode." The rectifying and freewheeling devices can introduce a power loss component in a power converter due to the forward voltage drop across the diode, particularly in a power converter that produces an output voltage of five volts or less. Schottky diodes, which have a relatively low forward voltage drop, are often employed in low-voltage power converter applications to reduce a diode forward voltage drop. However, passive rectifying devices such as Schottky diodes typically cannot achieve forward voltage drops of less than about 0.35 volts, thereby limiting a conversion efficiency of the power converter.

To achieve an acceptable level of efficiency, power converters that provide low output voltages (e.g., one volt) often employ rectifying devices that have forward voltage drops of less than about 0.1 volts. To provide further reduction of the power loss due to the forward voltage drop in a diode, an active semiconductor switch such as a metal-oxide semiconductor field-effect transistor ("MOSFET"), which provides a resistive voltage drop, is often employed to replace the diode. An active semiconductor switch, however, must be periodically driven into conduction and non-conduction modes or states in synchronism with a periodic waveform of an alternating current ("ac") voltage (e.g., an ac voltage produced across a secondary winding of a transformer). The active semiconductor switches may thereby avoid the higher forward voltage drops inherent in the passive rectifying devices. A design issue introduced by substituting an active semiconductor switch for a diode is the need to provide a drive signal therefor that is accurately synchronized with the operation of the power converter to control the conduction and non-conduction modes or states of the active semiconductor switch. An active semiconductor switch substituted for a diode in a power converter is generally referred to as a "synchronous rectifier" or "synchronous rectifier switch."

A number of circuit design techniques are known in the art to provide a drive signal for a synchronous rectifier. For example, U.S. Pat. No. 5,303,138, entitled "Low Loss Synchronous Rectifier for Application to Clamped-Mode Power Converters," to Rozman, issued Apr. 12, 1994, which is incorporated herein by reference, discloses that a gate of a synchronous rectifier applied to an active-clamp of a power converter may be driven by a terminal of a secondary winding of a transformer. As described in U.S. Pat. No. 6,288,920, entitled "Drive Compensation Circuit for Synchronous Rectifier and Method of Operating the Same," to Jacobs, et al., issued Sep. 11, 2001, which is incorporated herein by reference, a drive circuit employing a diode and a capacitor coupled in series with a secondary winding of a transformer may be constructed to drive the gate of a synchronous rectifier. As described U.S. Pat. No. 6,831,847, entitled "Synchronous Rectifier Drive Circuit and Power Supply Including Same," to Perry, issued Dec. 14, 2004, which is incorporated herein by reference, a drive circuit for a synchronous rectifier may be formed with a turn-on switch, a turn-off switch, a charge pump, and a pulse transformer.

Further known synchronous rectifiers are described in "Power Supply Cookbook," second edition, by Marty Brown, which is incorporated herein by reference. As described by Brown in section 3.6.2 therein, FIGUREs (a) and (c) show synchronous rectifiers driven by a primary side switching circuit with a direct connection as in FIGURE (a), and by means of a transformer in FIGURE (c). FIGURE (b) of Brown shows synchronous rectifiers driven directly by the output voltage of a transformer. Thus, as described in the references, either a particular power conversion topology including an active clamp may be employed to drive a control terminal of an active semiconductor switch employed as a synchronous rectifier, or an additional transformer winding may be employed for the same. Each of these approaches, however, provides an efficiency and/or a cost limitation that limits or otherwise penalizes the use of a synchronous rectifier in a many applications.

Accordingly, what is needed in the art is a driver for a synchronous rectifier in a power converter and related method that avoid the deficiencies in the prior art.

SUMMARY OF THE INVENTION

These and other problems are generally solved or circumvented, and technical advantages are generally achieved, by advantageous embodiments of the present invention that include a driver for a switch, method of driving a switch, and a power converter employing the same. In one embodiment, the driver for the switch includes a first driver switch coupled to a terminal of the switch. The driver also includes a second driver switch inverted with respect to the first driver switch and coupled to another terminal of the switch, wherein the first and second driver switches are configured to provide a drive signal to a control terminal of the switch.

In another aspect, the present invention provides a driver for the switch including a driver switch coupled to a terminal of a switch. The driver also includes a diode coupled to a control terminal of the driver switch and another terminal of the switch, wherein the driver switch and the diode are configured to provide a drive signal to a control terminal of the switch.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a driver constructed with an inverted switch (e.g., transistor) or diode to drive a control terminal of a switch (e.g., a synchronous rectifier switch), and a method of operating the same. While the principles of the present invention will be described in the environment of a power converter, any application that may benefit from a driver such as a power amplifier or a motor controller is well within the broad scope of the present invention.

Figure 1:
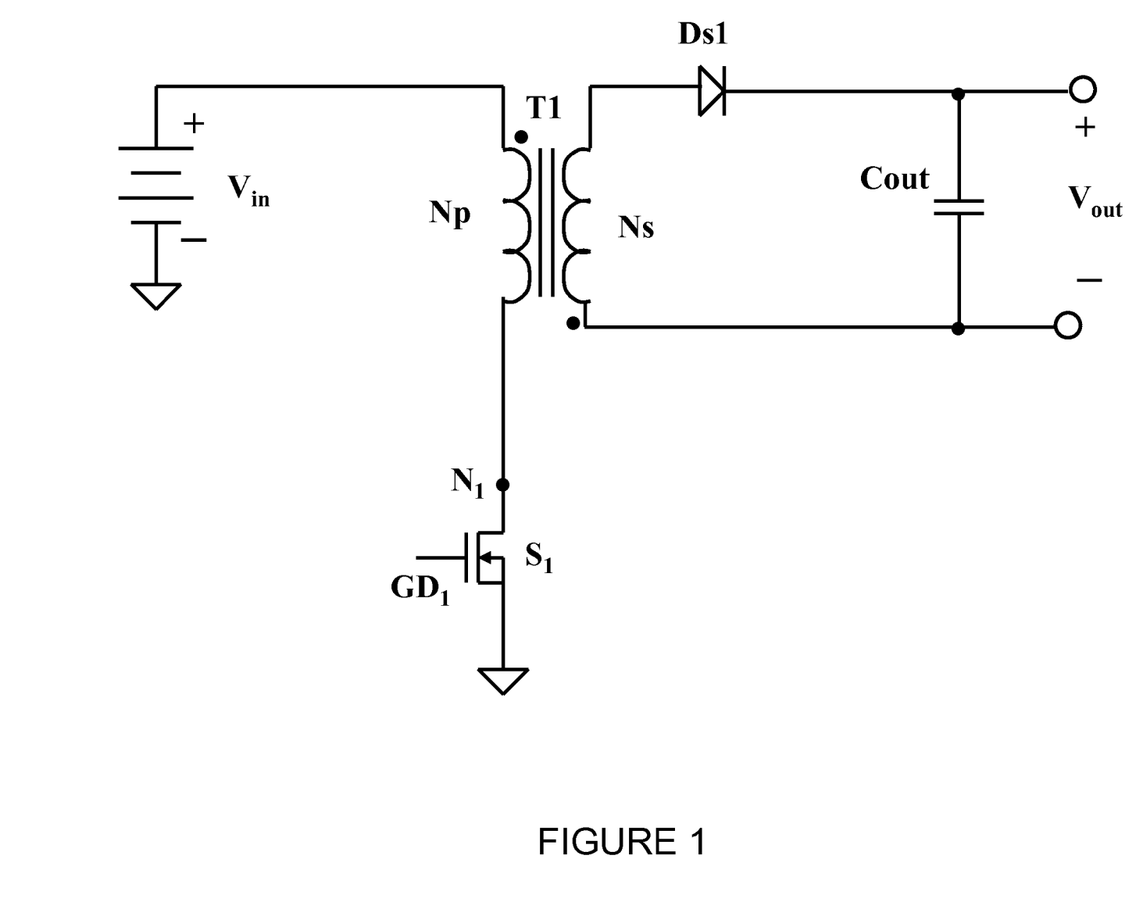
FIG. 1 illustrates a schematic diagram of an embodiment of portions of a power converter that provides an environment for application of the present invention.

Turning now to FIG. 1, illustrated is a schematic diagram of an embodiment of portions of a power converter (e.g., a flyback power converter) that provides an environment for application of the present invention. A power train of the power converter includes a power switch $S_1$ coupled to a source of electrical power (also referred to as an input power source such as a dc input power source) that provides an input voltage $V_{in}$. The source of electrical power supplies input power to an isolating transformer T1. The transformer T1 has a number of primary turns Np and a number of secondary turns Ns that are selected to provide an output voltage $V_{out}$ with consideration of a resulting duty cycle and stress on power train components. The power switch $S_1$ (e.g., an n-channel MOSFET) is controlled by a controller (e.g., a pulse-width modulation controller, not shown) that controls the power switch $S_1$ to be conducting for a duty cycle. Thus, the power switch $S_1$ conducts in response to gate drive signal $GD_1$ produced by the pulse-width modulation controller with a switching frequency $f_s$. The duty cycle is adjusted by the pulse-width modulation controller to regulate a characteristic of the output of the power converter such as an output voltage, an output current, or a combination of the two. The ac voltage appearing on the secondary winding of the transformer T1 is rectified by a diode Ds1, and the resulting rectified waveform is coupled to the output filter capacitor Cout to produce the output voltage $V_{out}$.

During the first portion of a duty cycle D, a current flowing through a magnetizing inductance of the transformer T1 increases, and the diode DS1 blocks application of a transformer secondary voltage to the output filter capacitor Cout. During a complementary portion of the duty cycle (generally co-existent with a complementary duty cycle "1-D" of the power switch $S_1$), the power switch $S_1$ in response to the gate drive signal $GD_1$ is transitioned to a non-conducting state, and the current flowing through the magnetizing inductance of the transformer T1 is scaled inversely by the turns ratio of the transformer T1 and is coupled through the diode Ds1 to the output filter capacitor Cout. During the complementary portion of the duty cycle 1-D, the current flowing through the magnetizing inductance of the transformer T1 decreases. In general, during the first portion of the duty cycle D, the duty cycle of the power switch $S_1$ may be adjusted to maintain a regulation of the output voltage $V_{out}$ of the power converter. Those skilled in the art should understand that a voltage spike snubber may be connected to a node $N_1$ to clamp a voltage spike that may be produced across the power switch $S_1$ when it is transitioned to a non-conducting state.

In order to regulate the output voltage $V_{out}$, a scaled value of the output voltage $V_{out}$, produced by a voltage divider network (not shown) coupled across the output terminals of the power converter, is typically compared against a reference voltage in the pulse-width modulation controller using an error amplifier. The output of the error amplifier and a sawtooth voltage signal are fed to a comparator. The output of the comparator controls the duty cycle of the power switch $S_1$. This forms a negative feedback arrangement to regulate the output voltage $V_{out}$ to a scaled value of the reference voltage. A larger duty cycle implies that the power switch $S_1$ is closed for a longer fraction of the switching period of the power converter. An active switch such as a MOSFET may be substituted for the diode Ds1 as a synchronous rectifier to improve power conversion efficiency.

As introduced herein, a driver for a switch employable as a synchronous rectifier switch produces a drive signal therefor, advantageously without the need for a current transformer or additional windings on the transformer, and without the need for a signal from a pulse-width modulation controller that controls the power switch(es) on the primary side of the power converter. The voltage across drain-to-source terminals of the switch employed as a synchronous rectifier switch is sensed by two switches (e.g., transistors) in a driver. One of the two transistors may be coupled in the driver in an inverted configuration. A reasonable number of switches (e.g., transistors or diodes) are advantageously employed to drive the synchronous rectifier switch.

Figure 2:
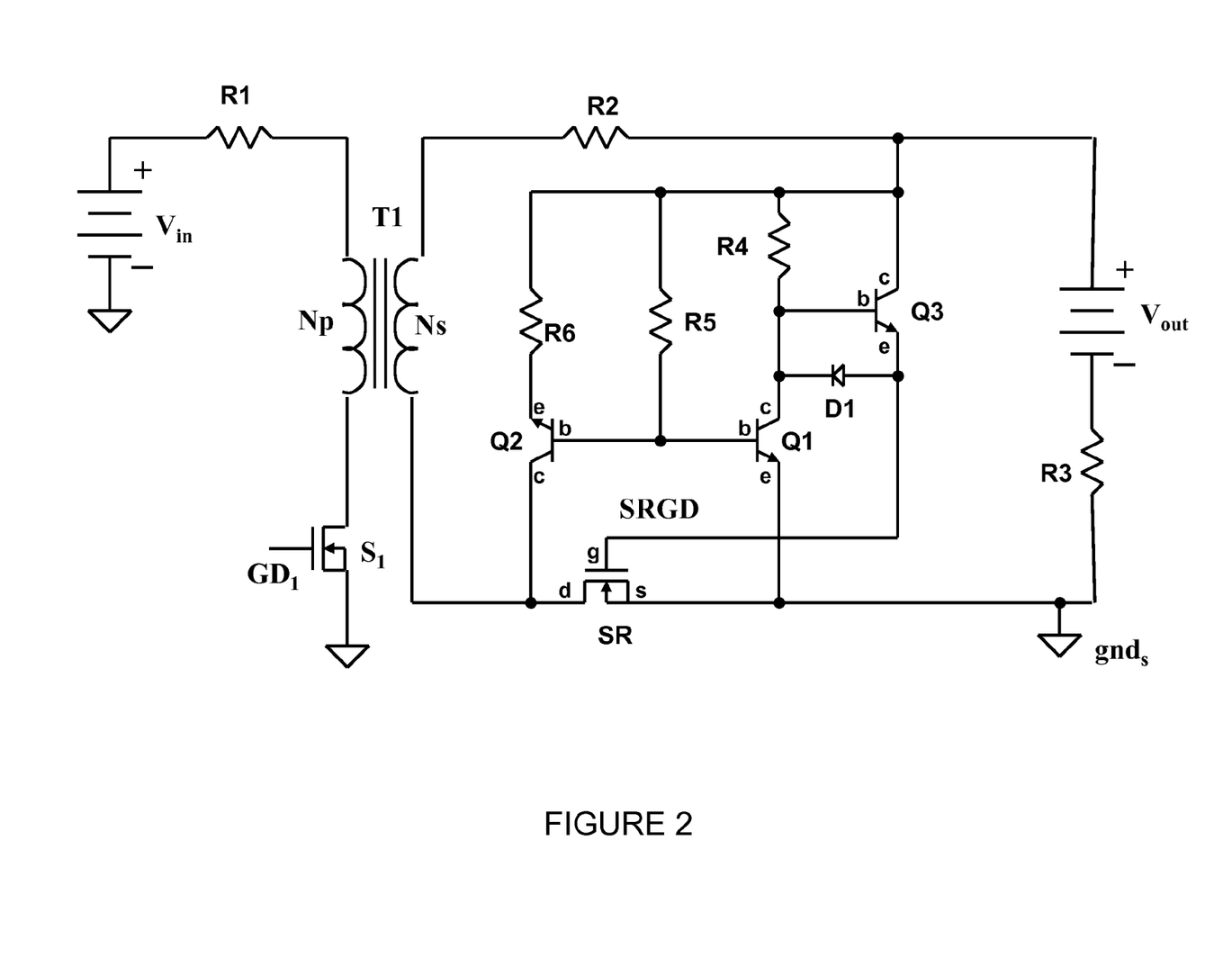
FIGS. 2 to 10 illustrate schematic diagrams of portions of power converters including embodiments of a driver for a switch constructed in accordance with the principles of the present invention.

Turning now to FIGS. 2 to 10, illustrated are schematic diagrams of portions of power converters including embodiments of a driver for a switch (e.g., synchronous rectifier switch) constructed in accordance with the principles of the present invention. Beginning with FIG. 2, the primary side of a power train of the power converter is illustrated with one terminal of the primary winding of a transformer T1 coupled to a first power switch $S_1$. The other terminal of the primary winding is coupled to a source of electrical power (e.g., an input power source such as a dc input power source) providing an input voltage $V_{in}$. A first resistor R1 represents a resistance of the primary winding of the transformer T1 and other incidental resistances in series with the primary side of the power train. As is well understood in the art, other components, not shown, are generally included on the primary side of the transformer T1 to reset the flux of the transformer T1 during a complementary portion of the duty cycle 1-D. The power converter, as described hereinbelow, is operable with forward, flyback, and other switched-mode power converter topologies. The secondary side of the power train is illustrated in FIG. 2 coupled to a load represented by a battery with an output voltage $V_{out}$. A second and third resistor R2, R3 represent resistances of the secondary winding of the transformer T1 and other incidental circuit resistances such as a resistance of an output terminal of the power converter. It should be noted that the turns of the primary and secondary windings of the transformer T1 are represented by Np, Ns, respectively.

The voltage across the synchronous rectifier switch SR, illustrated in FIG. 2 as an n-channel MOSFET with source "s," drain "d," and gate "g," is sensed by a driver formed with first and second driver switches (e.g., an n-type bipolar transistors) Q1, Q2. The first and second driver switches Q1, Q2 form at least a portion of a differential amplifier. The collector voltage of the first driver switch Q1 controls the voltage of a drive signal SRGD to the synchronous rectifier switch SR. The switch-on current is amplified by a third driver switch Q3, coupled between a collector terminal of the first driver switch Q1 and the gate of the synchronous rectifier switch SR, to reduce the switch-on time of the synchronous rectifier switch SR. A similar differential amplifier is well known in the art wherein a terminal such as the emitter of the second driver switch Q2 is used as an input thereto. In the illustrated embodiment, the second driver switch Q2 is inverted with respect to the first switch driver switch Q1 (i.e., the switched terminals or the emitter and collector terminals of the second driver switch Q2 are reversed in comparison to the switched terminals or the emitter and collector terminals of the first driver switch Q1). The collector terminal of the second driver switch Q2 is used as a differential amplifier input to provide the ability of the driver to withstand high voltage. Additionally, the inverse relationship between the first and second driver switches Q1, Q2 produces a small offset voltage for the differential amplifier because the typical base-to-collector voltage $V_{bc}$ is slightly higher than the base-to-emitter voltage $V_{be}$ at the same current level. The first and second driver switches Q1, Q2 preferably are switches of the same type such as matched transistors to ensure a predictable offset voltage at the input to the differential amplifier, wherein the second driver switch Q2 emulates a low-beta transistor due to the inverted configuration thereof. A reduced differential amplifier offset voltage enables the synchronous rectifier switch SR to be reliably switched off when its drain-to-source voltage is positive or close to zero.

The operation of the synchronous rectifier can be further explained as follows. The power converter is shown with a secondary side ground $gnd_s$ for purposes of description. During the first portion of the duty cycle D, when an upper terminal of the secondary winding of the transformer T1 is positive with respect to its lower terminal, a rectified current circulates clockwise through the secondary side of the power converter formed by the secondary winding, the battery with an output voltage $V_{out}$ representing the load and the synchronous rectifier switch SR. As a result, the drain of synchronous rectifier switch SR becomes negative by perhaps a few hundred millivolts with respect to the secondary side ground $gnd_s$. This causes the base of first driver switch Q1 to become slightly negative, or preferably at least not positive, with respect to an emitter thereof, thereby turning off the first driver switch Q1. The voltage of the collector of the first driver switch Q1 is pulled high by a fourth resistor R4, which in turn turns on the third driver switch Q3. Turning on the third driver switch Q3, which is coupled to the positive terminal of the output voltage $V_{out}$ of the power converter, raises the voltage of the gate (in accordance with the drive signal SRGD) of synchronous rectifier switch SR, thereby turning the synchronous rectifier switch SR on.

During the complementary portion of the duty cycle 1-D when the upper terminal of the secondary winding of the transformer T1 is negative with respect to its lower terminal, a current is prevented from circulating through the secondary side of the power converter at the synchronous rectifier switch SR. Again, the secondary side of the power converter is formed by the secondary winding, the battery representing the load with an output voltage $V_{out}$ and the synchronous rectifier switch SR. In this case, the drain of synchronous rectifier switch SR is positive with respect to secondary side ground $gnd_s$. The second driver switch Q2 is turned off, enabling a fifth resistor R5 to supply current to the base of the first driver switch Q1, thereby turning the first driver switch Q1 on. This pulls down the voltage of the base of the third driver switch Q3, thereby turning the third driver switch Q3 off. A first diode D1 (coupled to a collector terminal of the first driver switch Q1 and an emitter terminal of the third driver switch Q3) pulls down the gate of the synchronous rectifier switch SR, thereby turning the synchronous rectifier switch SR off, as necessary during this portion of the switching cycle. Thus, the driver including the differential amplifier formed with the first and second driver switches Q1, Q2 is able to withstand the voltage produced across the synchronous rectifier switch SR, while generating a drive signal SRGD for the synchronous rectifier switch SR with a few simple and inexpensive circuit components.

Thus, the driver for the synchronous rectifier switch SR includes the first, second and third driver switches Q1, Q2, Q3, the first diode D1, and fourth, fifth and sixth resistors R4, R5, R6. The sixth resistor R6 is coupled to a terminal (e.g., the emitter) of the second driver switch Q2 and across the fifth resistor R5. The first driver switch Q1 is coupled to a terminal (e.g., the source) of the synchronous rectifier switch SR and the second driver switch Q2 is inverted with respect to the first driver switch Q1 and is coupled to another terminal (e.g., the drain) of the synchronous rectifier switch SR. The first and second driver switches Q1, Q2 are configured to provide the drive signal SRGD to a control terminal (e.g., the gate) of the synchronous rectifier switch SR. Of course, while the illustrated embodiment provides a driver for a synchronous rectifier switch SR, the driver may be applicable to any switch including, without limitation, any power switch of the power converter, or otherwise. In the exemplary power converters that follow, like components thereof are designated with like references in the interest of brevity. Also, the operations of the following drivers and power converters are analogous to the power converter as described with respect to FIG. 2 and will not hereinafter be described.

Figure 3:
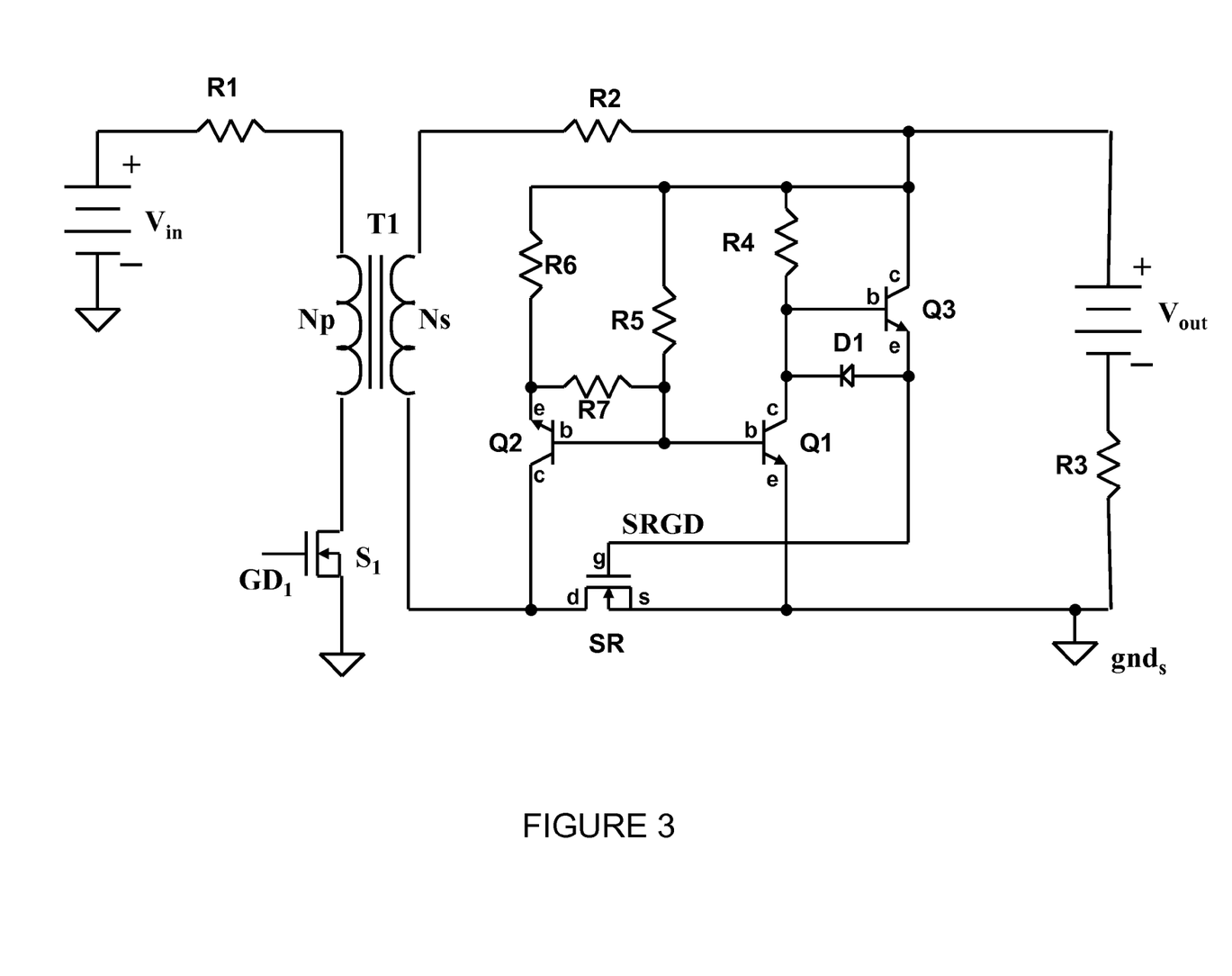
Figure 4:
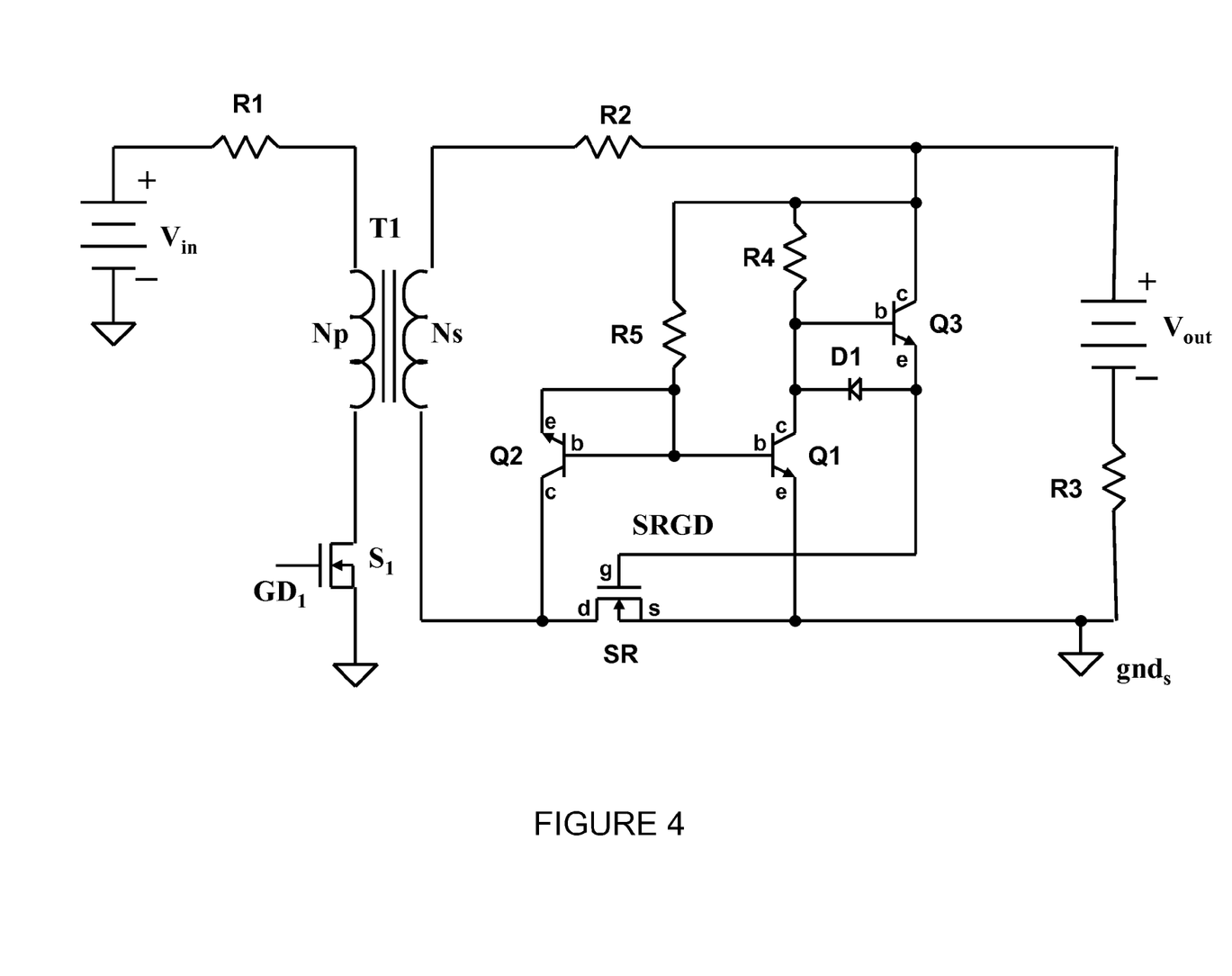

Turning now to FIG. 3, in addition to many of the components provided above with respect to FIG. 2, the driver includes a seventh resistor R7, coupled to the emitter and base of the second driver switch Q2, to reduce the emitter-base voltage thereof. The addition of the seventh resistor R7 enables the use of the driver and power converter at a higher output voltage. In this embodiment of the driver and power converter and others herein, the value of a particular component may be varied to meet the needs of a particular application. Additionally, the alternatives for the driver may be applied depending on the application therefor, such as an application with a particular switching frequency, power level, or output voltage. Regarding the driver as illustrated with respect to FIG. 4, the emitter of the second driver switch Q2 is directly coupled to its base to reduce the emitter-base voltage thereof to substantially zero. Both of the alternatives of the driver illustrated in FIGS. 3 and 4 produce a variation of the offset voltage. Therefore, the efficiency of the synchronous rectifier may change in comparison to the efficiency of the synchronous rectifier illustrated in FIG. 2.

Figure 5:
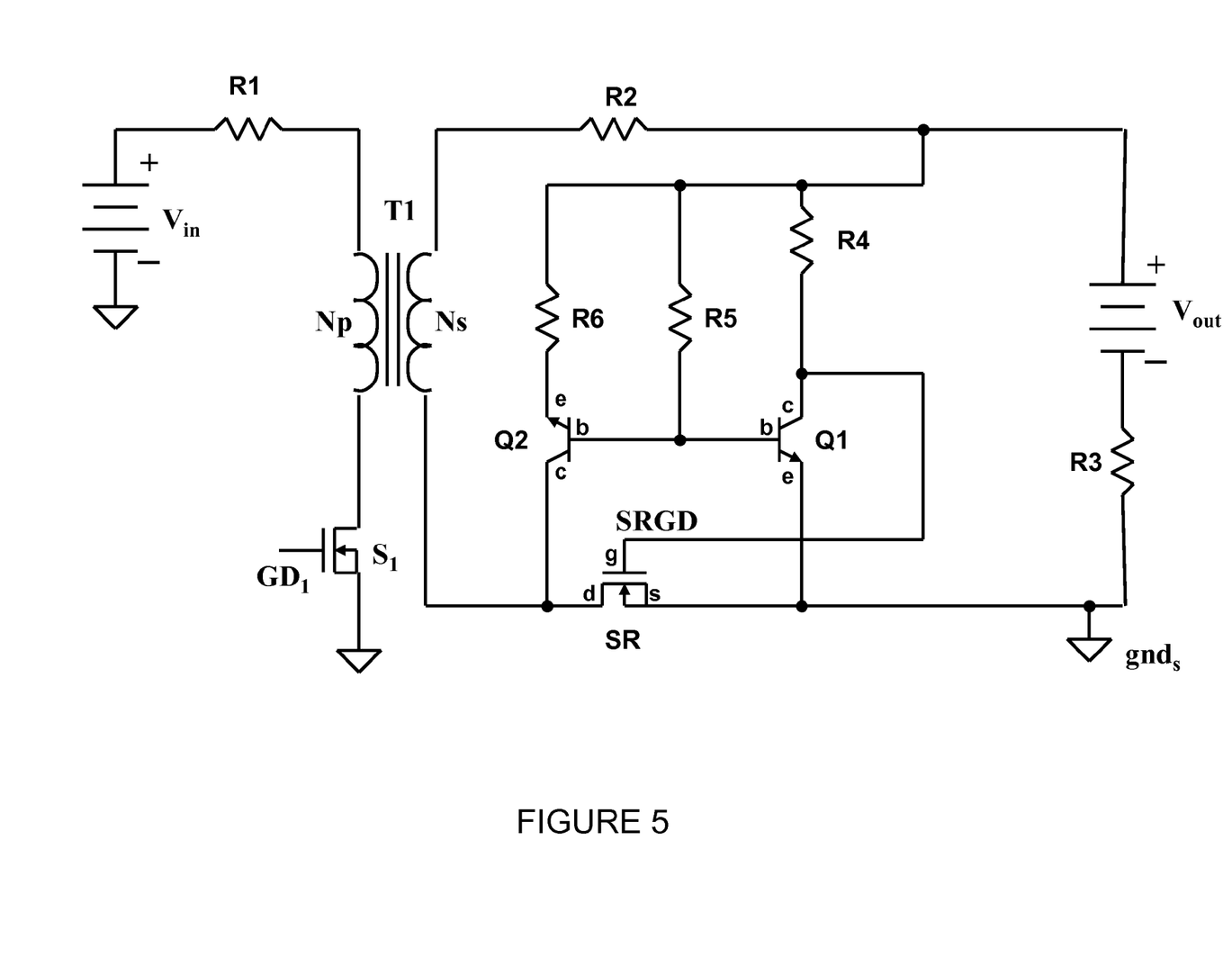

Turning now to FIG. 5, the third driver switch Q3 and the first diode D1 have been omitted from the driver discussed above. This alternative may be the lowest cost, since a driver switch and diode have been eliminated. In accordance therewith, the switch-on time of the synchronous rectifier switch SR may be longer than that of other alternatives, which may affect the efficiency of the synchronous rectifier and the power converter.

Figure 6:
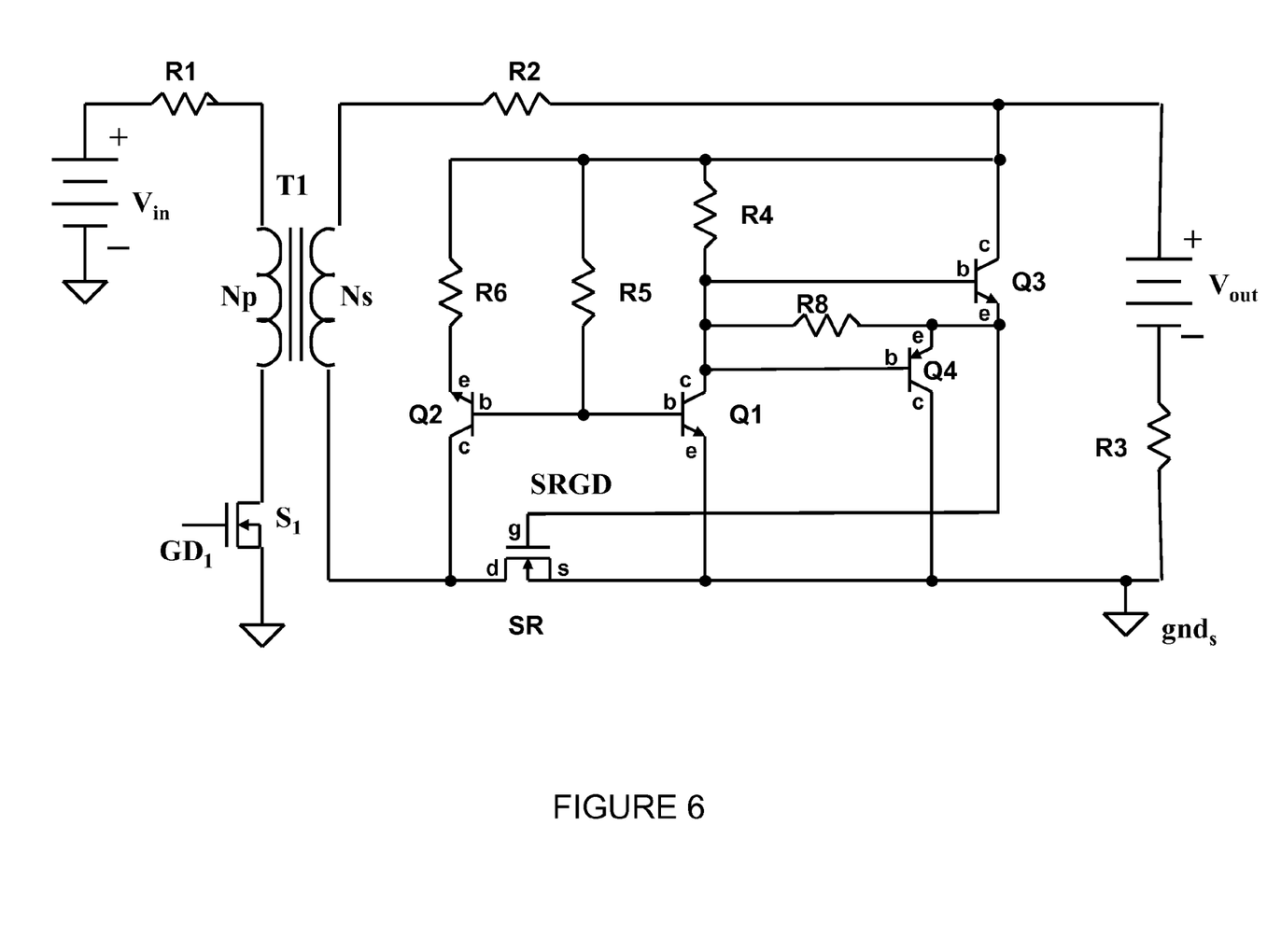

Turning now to FIG. 6, the first diode D1 illustrated in previous embodiments of the driver has been replaced with a fourth driver switch (e.g., a transistor) Q4, coupled between the collector terminal of the first driver switch Q1 and an emitter terminal of the third driver switch Q3, to decrease a switch-off time (i.e., increase a switch-off speed) of the synchronous rectifier switch SR. The driver as illustrated in FIG. 6 also includes an eighth resistor R8 coupled to the first, third and fourth driver switches Q1, Q3, Q4.

Figure 7:
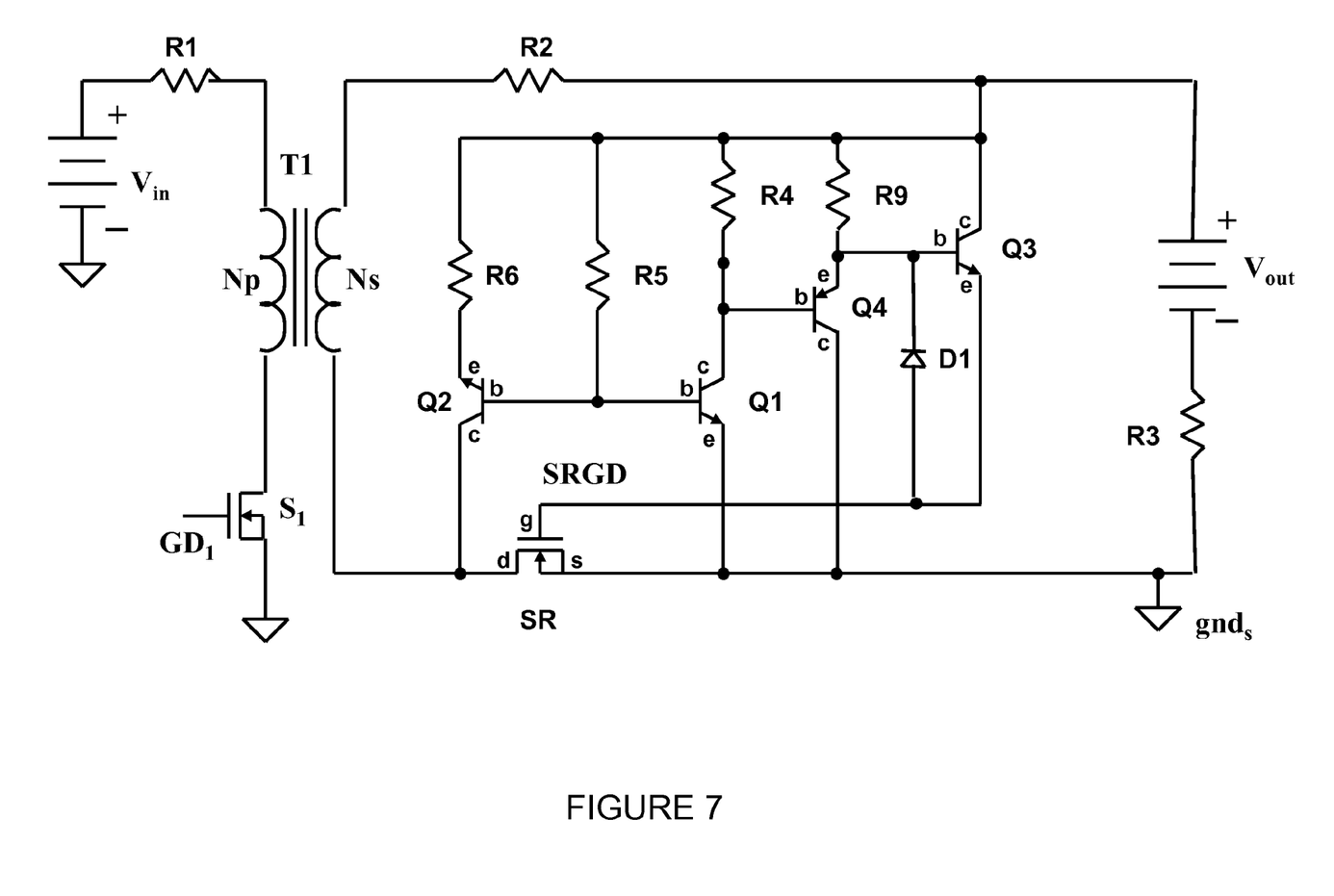

Turning now to FIG. 7, in addition to a fourth driver switch Q4 (coupled between the collector terminal of the first driver switch Q1 and the base terminal of the third driver switch Q3), the driver includes the first diode D1 coupled across the emitter-base of the third driver switch Q3. The driver also includes a ninth resistor R9 coupled to said fourth driver switch Q4. In this embodiment, the fourth driver switch Q4 acts as an impedance converter (e.g., high input impedance and low output impedance) to allow the third driver switch Q3 to be switched on with a higher base current, thereby causing the third driver switch Q3 to transition to an off state more quickly. Thus, the third and fourth driver switches Q3, Q4 cooperate to decrease a switch-off time (i.e., increase a switch-off speed) of the synchronous rectifier switch SR. Additionally, the fourth driver switch Q4 drives a higher current through the first diode D1.

Figure 8:
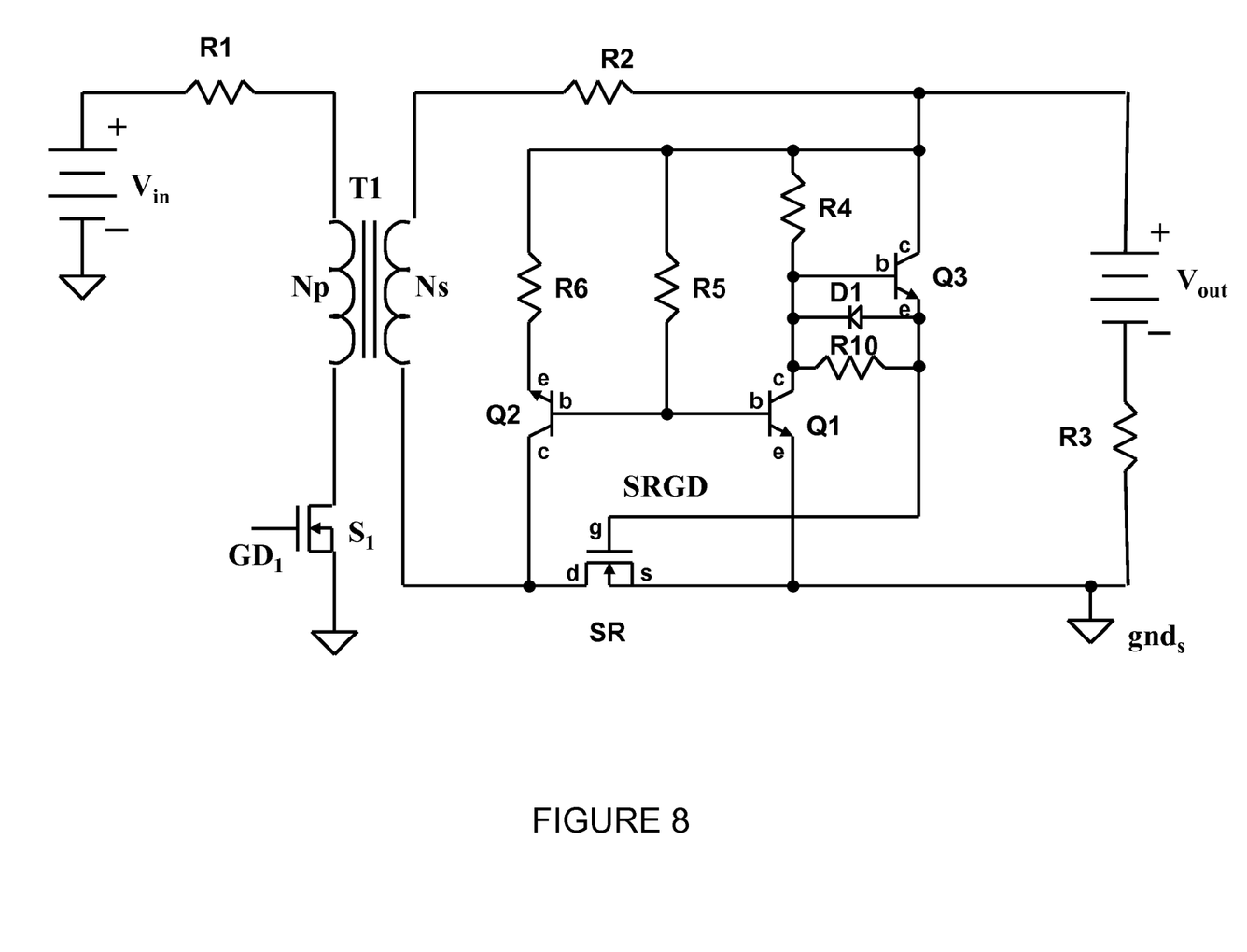
Figure 9:
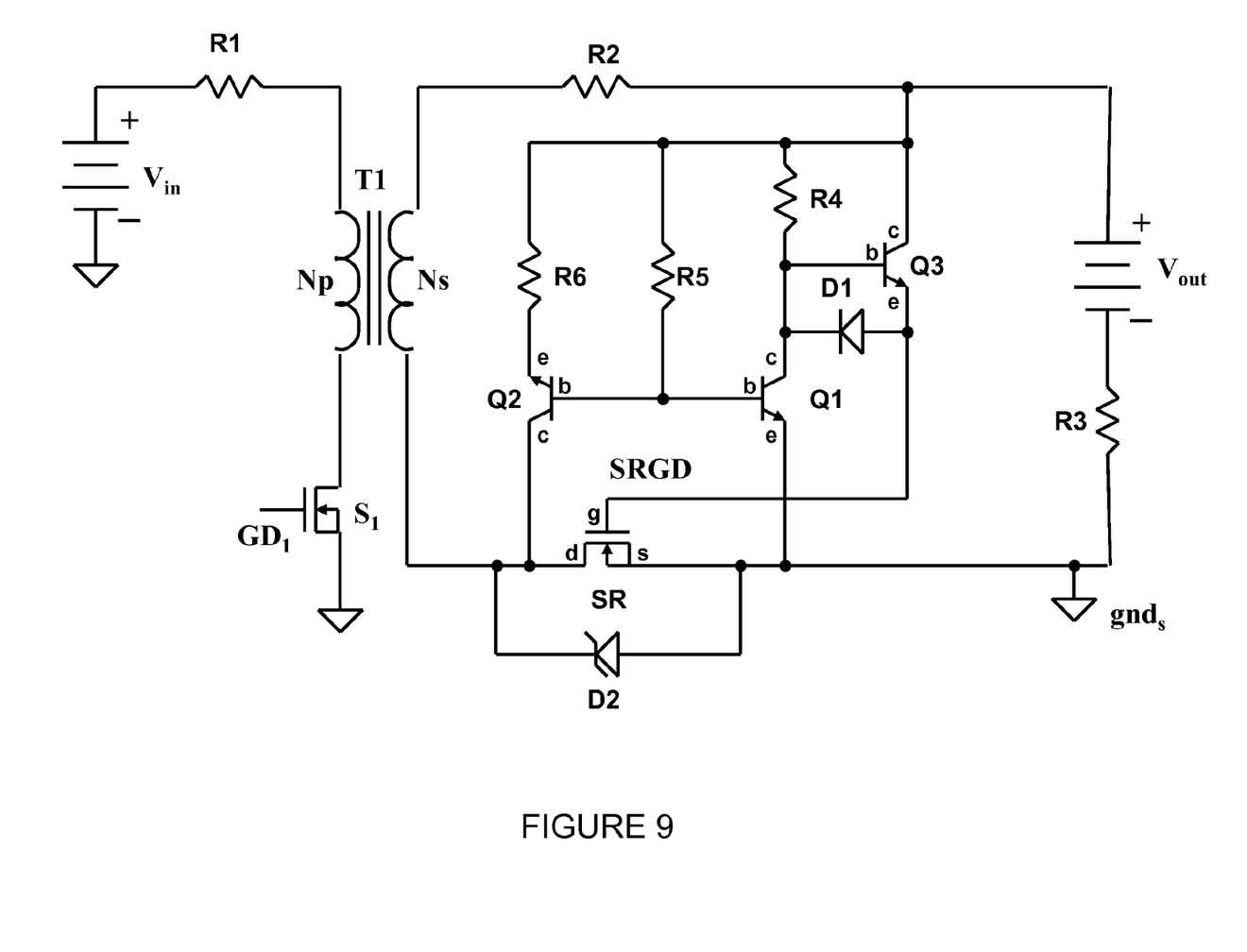

Turning now to FIG. 8, the driver includes a tenth resistor R10 coupled to the first and third driver switches Q1, Q3, across the first diode D1 and to the synchronous rectifier switch SR. The addition of the tenth resistor R10 lowers the switch-off voltage of the synchronous rectifier switch SR, which may be necessary for MOSFETs (serving as the synchronous rectifier switch SR) with a low gate threshold voltage employable in power converters that provide a low output voltage $V_{out}$. The embodiment of the power converter illustrated with respect to FIG. 9 includes a second diode (e.g., a Schottky diode) D2 in parallel with the synchronous rectifier switch SR to further improve the efficiency of the power converter.

Figure 10:
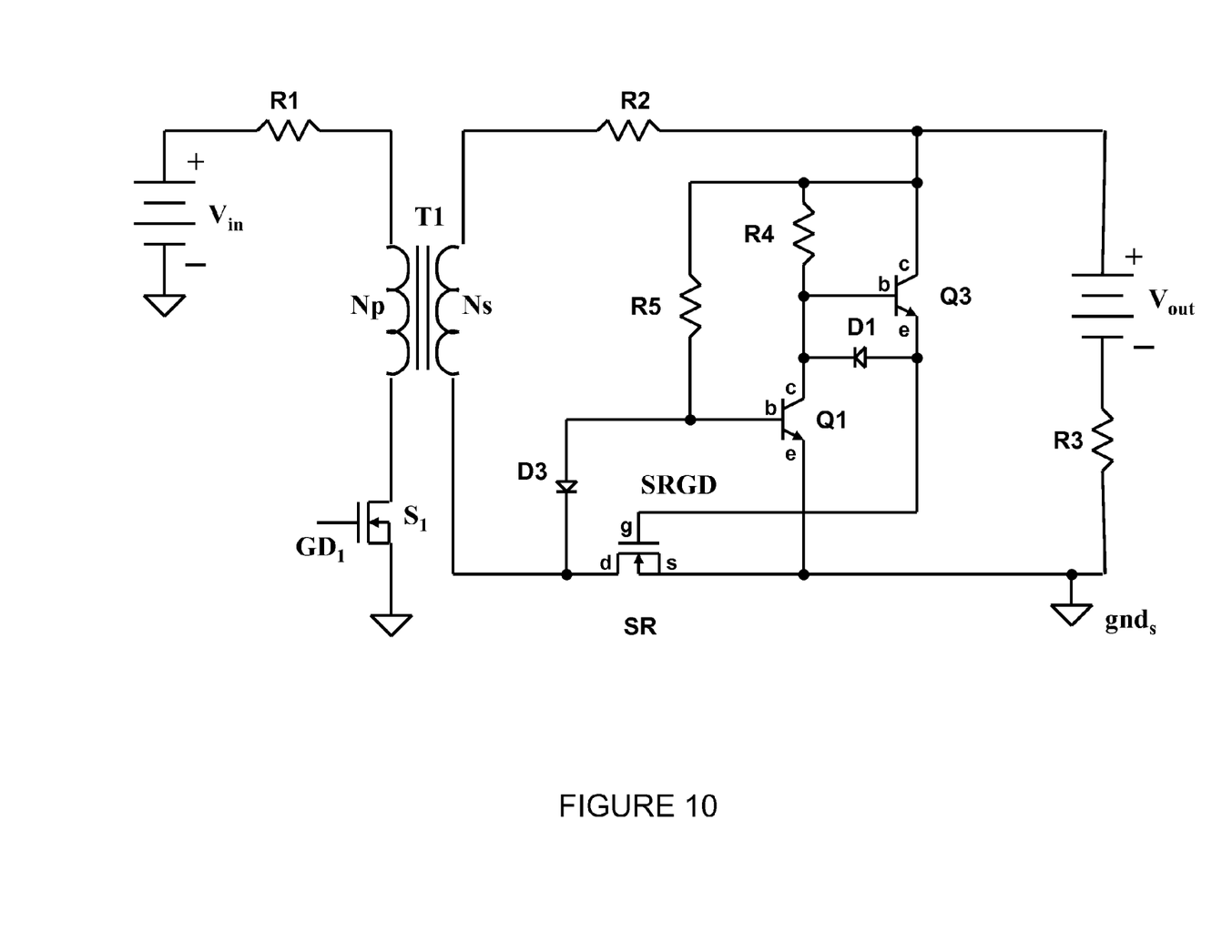

Turning now to FIG. 10, illustrated is another embodiment of a driver that includes a diode (e.g., a third diode D3) in lieu of the second driver switch Q2 illustrated and described with respect to previous embodiments of the driver for the synchronous rectifier switch SR. The first driver switch Q1 and third diode D3 should be selected to obtain a sufficiently small offset voltage for the driver including the differential amplifier formed from the first driver switch Q1 and third diode D3. In the illustrated embodiment, the driver includes the first driver switch Q1 coupled to a terminal (e.g., the source) of the synchronous rectifier switch SR and the diode (e.g., the third diode D3) coupled to a control terminal (e.g., the base) of the first driver switch Q1 and another terminal (e.g., the drain) of the synchronous rectifier switch SR. The first driver switch Q1 and the third diode D3 are configured to provide a drive signal SRGD to a control terminal (e.g., the gate) of the synchronous rectifier switch SR. The driver also includes at least one additional driver switch (e.g., the third driver switch Q3) configured to cooperate with the first driver switch Q1 and the third diode D3 to provide the drive signal SRGD to the gate of the synchronous rectifier switch SR. The driver further includes a diode (e.g., a first diode D1) coupled between a collector terminal of the first driver switch Q1 and an emitter terminal of the third driver switch Q3. The driver still further includes a resistor (e.g., a fourth resistor R4) coupled to the collector terminal of the first driver switch Q1 and another resistor (e.g., a fifth resistor R5) coupled to a node between the third diode D3 and base of the first driver switch Q1.

Again, while the illustrated embodiments provide a driver for a synchronous rectifier switch SR, the driver may be applicable to any switch including, without limitation, any power switch of the power converter, or otherwise. Additionally, many of the variations of the drivers and selected components therein, previous illustrated and described can be combined to generate further variations of a driver for a switch of a power converter or for other applications. The driver of FIG. 10 illustrates several of the components previously described above.

Those skilled in the art should understand that the previously described embodiments of a driver and power converter and related methods of operating the same are submitted for illustrative purposes only. In addition, various power converter topologies are well within the broad scope of the present invention. While the driver has been described in the environment of a power converter including a differential amplifier with an inverted driver switch or diode to drive a control terminal of a synchronous rectifier switch to power a load, advantageously with improved efficiency, the driver may also be applied to other systems such as, without limitation, a power amplifier, a motor controller, and a system to control an actuator in accordance with a stepper motor or other electromechanical device.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A driver for a controllable switch, comprising:
   a first driver switch coupled to a switched terminal of said controllable switch; and
   a second driver switch inverted with respect to said first driver switch and coupled to another switched terminal of said controllable switch, wherein said first and second driver switches are configured to provide a drive signal to a control terminal of said controllable switch to turn on said controllable switch when said another switched terminal of said controllable switch becomes negative with respect to said switched terminal of said controllable switch and to turn off said controllable switch when said another switched terminal of said controllable switch becomes positive with respect to said switched terminal of said controllable switch.

2. The driver as recited in claim 1 wherein said first and second driver switches form at least a portion of a differential amplifier.

3. The driver as recited in claim 1 wherein said first and second driver switches are matched transistors.

4. The driver as recited in claim 1 further comprising at least one additional driver switch configured to cooperate with said first and second driver switches to provide said drive signal to said control terminal of said controllable switch.

5. The driver as recited in claim 1 further comprising a diode coupled between a switched terminal of said first driver switch and a switched terminal of a third driver switch.

6. The driver as recited in claim 1 further comprising a diode coupled between a switched terminal of said first driver switch and a switched terminal of a third driver switch, and a resistor coupled across said diode.

7. The driver as recited in claim 1 further comprising a resistor coupled across a switched terminal and a control terminal of said second driver switch.

8. The driver as recited in claim 1 wherein terminalsa control terminal and a switched terminal of said second driver switch are coupled together.

9. The driver as recited in claim 1, further comprising:
   a third driver switch coupled between a switched terminal of said first driver switch and said control terminal of said controllable switch; and
   a fourth driver switch coupled between said switched terminal of said first driver switch and a switched terminal of said third driver switch.

10. The driver as recited in claim 1 further comprising a diode parallel-coupled to said controllable switch.

11. A method comprising providing a drive signal to a control terminal of a controllable switch with a first driver switch coupled to a switched terminal of said controllable switch, and a second driver switch inverted with respect to said first driver switch and coupled to another switched terminal of said controllable switch, said first and second driver switches providing said drive signal to said control terminal of said controllable switch to turn on said controllable switch when said another switched terminal of said controllable switch becomes negative with respect to said switched terminal of said controllable switch and to turn off said controllable switch when said another switched terminal of said controllable switch becomes positive with respect to said switched terminal of said controllable switch.

12. The method as recited in claim 11 further comprising turning off said controllable switch with a diode coupled between a switched terminal of said first driver switch and a switched terminal of a third driver switch in cooperation with said first and second driver switches.

13. The method as recited in claim 11 further comprising turning off said controllable switch with a diode coupled between a switched terminal of said first driver switch and a switched terminal of a third driver switch in cooperation with said first and second driver switches and lowering a switch-off voltage of said controllable switch with a resistor coupled across said diode.

14. The method as recited in claim 11 further comprising reducing a voltage across said second driver switch with a resistor coupled across a switched terminal and a control terminal of said second driver switch.

15. The method as recited in claim 11, further comprising:
   turning on said controllable switch with a third driver switch coupled between a switched terminal of said first driver switch and said control terminal of said controllable switch in cooperation with said first and second driver switches; and
   decreasing a switch-off time of said controllable switch with a fourth driver switch coupled between said switched terminal of said first driver switch and a switched terminal of said third driver switch.

16. A power converter, comprising:
   a power switch coupled to a source of electrical power;
   a synchronous rectifier switch configured to provide an output voltage for said power converter; and
   a driver for said synchronous rectifier switch, including:
      a first driver switch coupled to a switched terminal of said synchronous rectifier switch, and
      a second driver switch inverted with respect to said first driver switch and coupled to another switched terminal of said synchronous rectifier switch, wherein said first and second driver switches are configured to provide a drive signal to a control terminal of said synchronous rectifier switch to turn on said synchronous rectifier switch when said another switched terminal of said synchronous rectifier switch becomes negative with respect to said switched terminal of said synchronous rectifier switch and to turn off said synchronous rectifier switch when said another switched terminal of said synchronous rectifier switch becomes positive with respect to said switched terminal of said synchronous rectifier switch.

17. The power converter as recited in claim 16 wherein said driver further comprises at least one additional driver switch configured to cooperate with said first and second driver switches to provide said drive signal to said control terminal of said synchronous rectifier switch.

18. The power converter as recited in claim 16 wherein said driver, further comprises:
   a diode coupled between a switched terminal of said first driver switch and a switched terminal of a third driver switch configured to turn off said synchronous rectifier switch in cooperation with said first and second driver switches; and
   a resistor coupled across said diode configured to lower a switch-off voltage of said synchronous rectifier switch.

19. The power converter as recited in claim 16 wherein said driver further comprises a resistor coupled across a switched terminal and a control terminal of said second driver switch configured to reduce a voltage across said second driver switch.

20. The power converter as recited in claim 16 wherein said driver, further comprises:
   a third driver switch coupled between a switched terminal of said first driver switch and said control terminal of said synchronous rectifier switch configured to turn on said synchronous rectifier switch in cooperation with said first and second driver switches; and
   a fourth driver switch coupled between said switched terminal of said first driver switch and a switched terminal of said third driver switch configured to decrease a switch-off time of said synchronous rectifier switch.

21. A driver for a controllable switch, comprising:
   a driver switch coupled to a switched terminal of said controllable switch; and
   a diode coupled to a control terminal of said driver switch and another switched terminal of said controllable switch, wherein said driver switch and said diode are configured to provide a drive signal to a control terminal of said controllable switch to turn on said controllable switch when said another switched terminal of said controllable switch becomes negative with respect to said switched terminal of said controllable switch and to turn off said controllable switch when said another switched terminal of said controllable switch becomes positive with respect to said switched terminal of said controllable switch.

22. The driver as recited in claim 21 wherein said controllable switch is a synchronous rectifier switch employable in a power converter.

23. The driver as recited in claim 21 wherein said driver switch and said diode form at least a portion of a differential amplifier.

24. The driver as recited in claim 21 further comprising at least one additional driver switch configured to cooperate with said driver switch and said diode to provide said drive signal to said control terminal of said controllable switch.

25. The driver as recited in claim 21 further comprising another diode coupled between a switched terminal of said driver switch and a switched terminal of another driver switch.

26. The driver as recited in claim 21 further comprising a resistor coupled to a switched terminal of said driver switch.

27. The driver as recited in claim 21 further comprising a resistor coupled to a node between said diode and said control terminal of said driver switch.

28. A method comprising providing a drive signal to a control terminal of a controllable switch with a driver switch coupled to a switched terminal of said controllable switch, and a diode coupled to a control terminal of said driver switch and another switched terminal of said controllable switch, said driver switch and said diode providing said drive signal to said control terminal of said controllable switch to turn on said controllable switch when said another switched terminal of said controllable switch becomes negative with respect to said switched terminal of said controllable switch and to turn off said controllable switch when said another switched terminal of said controllable switch becomes positive with respect to said switched terminal of said controllable switch.

29. The method as recited in claim 28 further comprising providing said drive signal to said control terminal of said controllable switch with at least one additional driver switch.

30. The method as recited in claim 28 further comprising turning off said controllable switch with another diode coupled between a switched terminal of said driver switch and a switched terminal of another driver switch in cooperation with said driver switch and said diode.

31. A power converter, comprising:
   a power switch coupled to a source of electrical power;
   a synchronous rectifier switch configured to provide an output voltage for said power converter; and
   a driver for said synchronous rectifier switch, including:
      a driver switch coupled to a switched terminal of said synchronous rectifier switch; and
      a diode coupled to a control terminal of said driver switch and another switched terminal of said synchronous rectifier switch, wherein said driver switch and said diode are configured to provide a drive signal to a control terminal of said synchronous rectifier switch to turn on said synchronous rectifier switch when said another switched terminal of said synchronous rectifier switch becomes negative with respect to said switched terminal of said synchronous rectifier switch and to turn off said synchronous rectifier switch when said another switched terminal of said synchronous rectifier switch becomes positive with respect to said switched terminal of said synchronous rectifier switch.

32. The power converter as recited in claim 31 wherein said driver switch and said diode form at least a portion of a differential amplifier.

33. The power converter as recited in claim 31 wherein said driver further comprises at least one additional driver switch configured to cooperate with said driver switch and said diode to provide said drive signal to said control terminal of said synchronous rectifier switch.

34. The power converter as recited in claim 31 wherein said driver further comprises another diode coupled between a switched terminal of said driver switch and a switched terminal of another driver switch configured to turn off said synchronous rectifier switch in cooperation with said driver switch and said diode.

35. The power converter as recited in claim 31 wherein said driver further comprises a resistor coupled to a node between said diode and said control terminal of said driver switch.

* * * * *